US006112151A

United States Patent [19]

Kruse

[11] Patent Number: 6,112,151

[45] Date of Patent: Aug. 29, 2000

[54] ADAPTIVE EMISSION CONTROL WITH COMMUNICATION NETWORK

[76] Inventor: Douglas C. Kruse, 2115-103 High Pointe Dr., Corona, Calif. 91719

[21] Appl. No.: 09/264,488

[22] Filed: Mar. 8, 1999

[51] Int. Cl.[7] .............................. G06F 19/00; B60T 7/18

[52] U.S. Cl. .......................... 701/115; 180/167; 701/207; 701/213; 701/217

[58] Field of Search .................................... 123/436, 478, 123/486; 180/167; 701/1, 2, 25, 101, 102, 103, 104, 105, 114, 115, 207, 213, 215; 340/933, 936, 939

[56] References Cited

U.S. PATENT DOCUMENTS

| | | | |
|---|---|---|---|
| 4,883,034 | 11/1989 | Yashiki et al. | 701/115 |
| 5,315,295 | 5/1994 | Fujii | 340/936 |
| 5,446,665 | 8/1995 | Adrian et al. | 123/486 |
| 5,638,790 | 6/1997 | Minowa et al. | 123/436 |
| 5,769,051 | 6/1998 | Bayron et al. | 701/115 |
| 5,983,156 | 11/1999 | Andrews | 701/115 |
| 5,995,879 | 11/1999 | Ginzel et al. | 180/167 |
| 5,999,876 | 12/1999 | Irons et al. | 701/115 |
| 6,012,013 | 1/2000 | McBurney | 701/207 |
| 6,021,371 | 2/2000 | Fultz | 701/207 |

*Primary Examiner*—Willis R. Wolfe
*Attorney, Agent, or Firm*—Gene Scott-Patent Law & Venture Group

[57] ABSTRACT

A pollution control method and apparatus devices which have two or more modes of operation in an air breathing engine. One mode of operation optimizes the constituents of engine exhaust fractions for global environmental benefits when a vehicle is operated in a clean air attainment area. A second or additional modes of operation optimize the engine exhaust fractions for ultra-low emission of ozone precursors and other air pollutants, when and where necessary to achieve local ambient air quality standards, in a clean air non-attainment area. The present invention provides methods for receiving commands over a national range and of automatically switching modes to achieve optimal performance.

14 Claims, 10 Drawing Sheets

Algorithm to produce precise forecast for emission control command.

0010 Input AQMD ozone air quality forecast of PEAK OZONE value.

0020 Is forecast of PEAK OZONE value on Pollution Standard Index equal to 80 OR LESS?

0030 If 0020 YES, display emission control MODE ONE.

0040 If 0020 NO, go to 0050.

0050 SELECT historical data set graph of OZONE VERSUS TIME for PEAK OZONE value equal to PEAK OZONE VALUE at 0010.

0060 If match, SELECT and go to 0080.

0070 If no match, SELECT next higher PEAK OZONE value in data file.

0080 STORE selected graph of OZONE VERSUS TIME.

0090 LOOK UP present CLOCK TIME.

0100 LOOK UP value of HOURLY OZONE for CLOCK TIME PLUS 6 hours on graph stored in 0080.

0110 Is OZONE VALUE 0010 a value of 80 OR LESS?

0120 If YES, post MODE ONE.

0130 If NO, display MODE THREE.

0140 Restart at 0010 at next change of CLOCK TIME HOUR.

*Fig. 10*

ADAPTIVE EMISSION CONTROL WITH COMMUNICATION NETWORK

This application claims the filing date of a previously filed provisional application having Ser. No. 60/078,755 and an assigned filing date of Mar. 9, 1998 and which contains subject matter substantially the same as that described and claimed in the present application.

BACKGROUND OF THE INVENTION

1. Field of the Invention

The present invention relates generally to combustion equipment and especially internal combustion engines, and more particularly to pollution control methods with ambient condition responsive means, including a communication network for verification of emission compliance.

2. Description of Related Art

Emission of carbon dioxide from combustion engines, and subsequent accumulation in the atmosphere, contributes to global climate change. Reduced amounts of carbon dioxide in engine exhaust provides a global environmental benefit as well as economic value from reduced fuel consumption. There are numerous methods and devices known to those skilled in the art for achievement of low emission of carbon dioxide, but many have the undesired effect of preventing compliance with emission regulations for ozone precursors.

On some days, local air quality in a given metro area is unhealthful due to an excess concentration of tropospheric ozone. One remedy for this local environmental condition is a reduction in the fraction of ozone precursors within engine exhaust. The prior art uses full-time engine emission control devices for ozone precursor reduction to receive engine or vehicle certification by the Environmental Protection Agency pursuant to the Clean Air Act and the Clean Air Act Amendment.

On a very limited number of hours on some days, local air quality in a given metro area is very unhealthful or even hazardous due to an extreme excess concentration of tropospheric ozone. One remedy for this local environmental condition is certification for ultra-low fraction of ozone precursors within engine exhaust. The prior art uses full-time emission control devices for very-low ozone precursor emission to receive certification by the Environmental Protection Agency pursuant to the Clean Air Act and the Clean Air Act Amendment in regions such as California where additional ozone precursor reduction is required by local air quality regulations.

The overall effect of compliance with EPA emission certification is usually a net reduction in engine fuel efficiency combined with an increase in carbon dioxide emissions for a given amount of economic activity. This increase in the relative amount of carbon dioxide emissions is detrimental to the global environmental objective of stabilization of atmospheric greenhouse gasses, including carbon dioxide.

Prior art methods and devices for exhaust pollution control are fixed and independent of the ambient air quality and are unresponsive to a forecast of future ambient air quality. When a local metro area is in compliance with the Environmental Protection Agency standards for healthful air, a fixed mode engine control system will produce an excess fraction of carbon dioxide in the engine exhaust while producing a fraction of ozone precursors lower than necessary for maintenance of healthful air.

This poses a dilemma for designers of pollution control equipment. Some techniques for reduction of ozone precursors, such as retarded injection timing for direct injection engines, will diminish beyond necessity the oxides of nitrogen exhaust fraction while increasing the carbon dioxide fraction. Thus, local environmental conditions are not improved, while global environmental conditions are diminished.

SUMMARY OF THE INVENTION

The environmental dilemma of global versus local emission control can be overcome by use of one low emission mode for global environmental conditions and a separate ultra-low emission mode at a time when needed within a metro area to achieve local environmental conditions for compliance with the National Ambient Air Quality Standards.

According to the present invention, the method to obtain the following objects is put into practice by combining a precise ambient air quality forecast with a communication system, a pollution control device and a record-keeping device. The pollution control method includes a mode-switching means connected with one or more engine control devices which can produce two or more engine operating modes; whereby an engine normally operating in a first mode having an optimum specific fuel consumption characteristic while maintaining compliance with regional, national or global emissions regulations, and further, which can be switched to a second mode with ultra-low, non-$CO_2$ emissions combined with a sub-optimum specific fuel consumption; whereby the command to switch from the first mode to the second mode, or more generally, between modes, is in response to a signal indicating a forecast of unhealthful ambient air quality for the metro area in which the engine will be operating.

It is accordingly an object of the present invention to provide a pollution control method including devices which have two or more modes of operation. One mode of operation will optimize the constituents of engine exhaust for global environmental benefits when a vehicle is operated in a clean air attainment area. A second or additional modes of operation will optimize the engine exhaust fractions for ultra-low emission of ozone precursors and other non-$CO_2$ pollutants, when and where necessary to achieve local ambient air quality standards, in a clean air non-attainment area.

It is another object of the present invention to provide a method of forecasting future local ambient air quality more precisely than is accomplished with the prior art; a method for communicating the local forecast to an engine or an engine operator; and a communication network that confirms and records geographic and chronological compliance with emission standards.

It is another object of the present invention to achieve the foregoing objects by converting the engine operating mode from one thermodynamic cycle, such as the Diesel limited pressure cycle, to another thermodynamic cycle, such as the Kruse limited temperature cycle.

It is yet another object of the present invention to accomplish the foregoing objects in a simple manner.

Additional objects and advantages of the present invention are apparent from the drawings and specifications which follow.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 10 is an algorithm or instruction set for producing a precise air quality forecast.

DETAILED DESCRIPTION OF THE INVENTION

Figure 1:
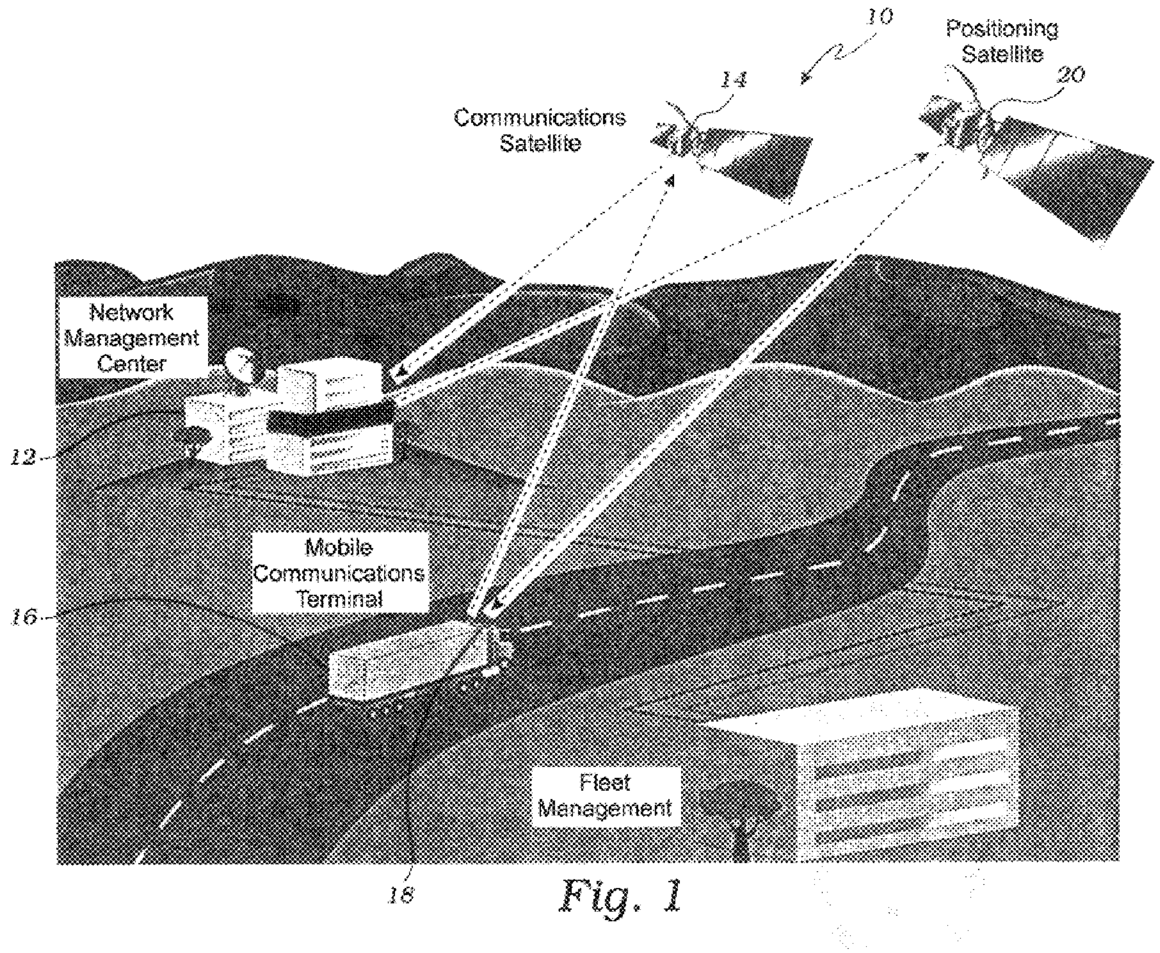
FIG. 1 is pictorial representation of a communication network for emission control.

With reference to FIG. 1, there is shown a pictorial representation of a communication network for emission control 10 employing the teachings of the present invention. It will become evident to those skilled in the art that the advantages of the invention may be realized with wireless communication equipment as well as with a simple telephone link and other embodiments of well known telecommunications methods. Further, although a single vehicle is shown in FIG. 1 for simplicity, it will be understood that a network incorporating the invention will typically serve multiple vehicles, as well as stationary plants such as power generating facilities. Therefore, when referring to "vehicle" or "apparatus" in this detailed description, it shall be understood that these terms refer to engines on vehicles or in stationary plants located in a large geographical region, nationally or internationally.

The network 10 comprises a network management center 12 that sends an emission control signal to a communications satellite 14 which relays the signal to a vehicle 16 having a mobile communications terminal 18 that also receives a signal from a global positioning satellite 20 as well as a time signal from the GPS or a clock within the mobile communications terminal 18. The mobile communications terminal 18 records received data and a time signal and then sends an emission control command 48 (FIG. 2) to an emission control device 52 (FIG. 3) on board the vehicle 16.

Figure 2:
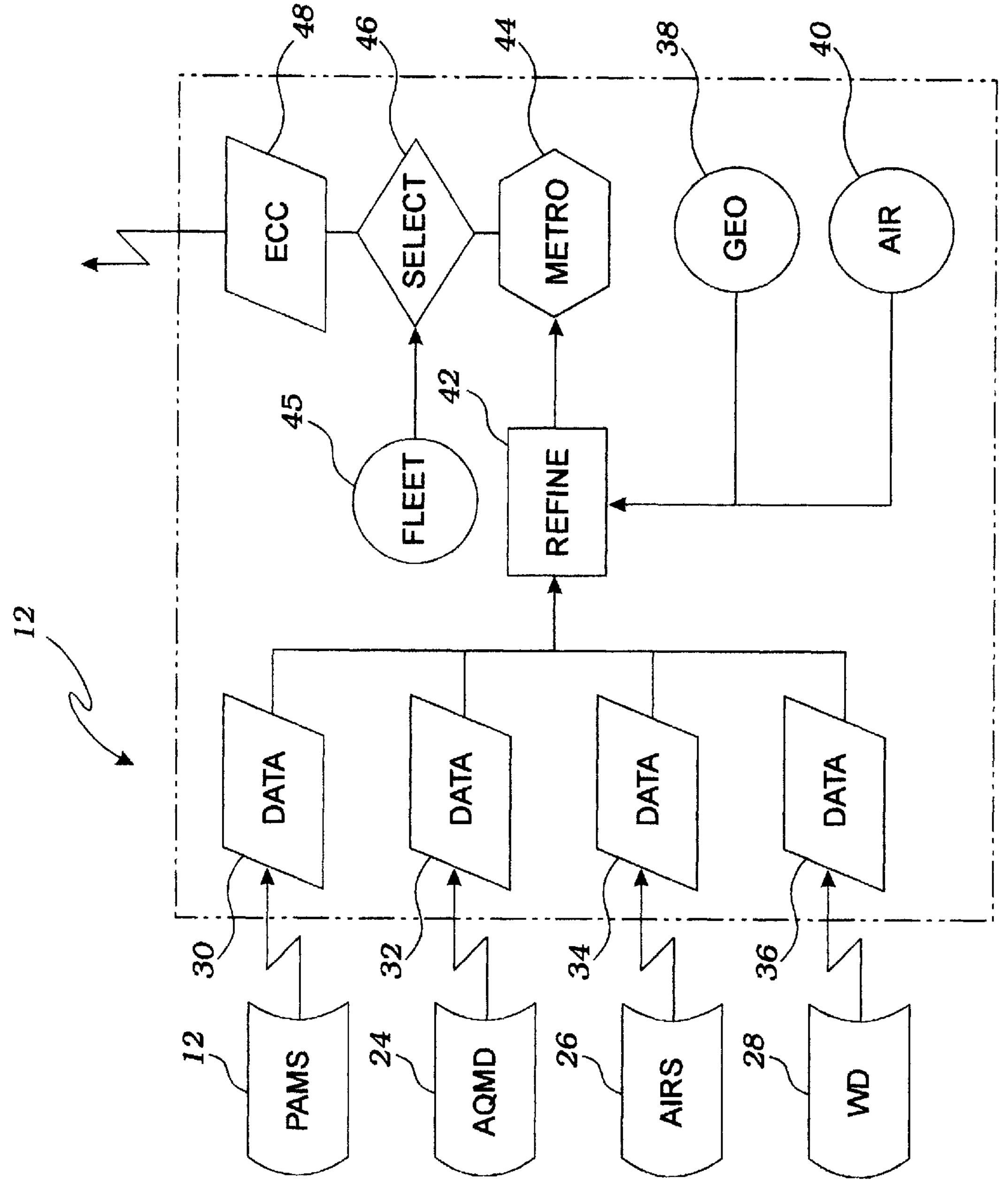
FIG. 2 is a block diagram of a network management center.

Referring now also to FIG. 2, the network management center 12 communicates with: a photochemical assessment monitoring station 22 to receive an ozone precursor, ozone and meteorology data set 30; a local air quality management district office 24 to receive an air quality forecast 32; an aerometric information retrieval system office 26 to receive additional air quality data 34; and a weather data office 28 to receive weather forecast data 36.

As will be explained in greater detail below, an interpretive algorithm 42 defines the data to provide, in accordance with the invention, a more precise metro area forecast 44 which is sent to selected vehicles 16, by a service provider in a metro area of current operation, giving the time and location when an engine should be switched from a primary operating mode defined by having an ultra-low carbon dioxide exhaust fraction to an alternate operating mode defined by having an ultra-low exhaust fraction of ozone precursors in order to meet the environmental needs of each metro area, with a first objective of clean air attainment in the local metro area, and a second objective of reduced emission of global warming gases. The primary operating mode as described above is determined by the requirements specified in the Federal Clean Air Act and the amendment thereto. The alternative operating mode as described above is determined by the requirements of local agencies primarily acting for States, counties and cities to meet conditions of air quality financial incentive programs. Clearly the present method is designed to meet the objects defined above, but similar methods, also protected by the claims defined below may be applied in a wide range of different situations.

The algorithm 42 utilizes geographic data 38 and air quality historical data 40 to produce a precise metro area forecast 44 which is combined with selected 46 fleet vehicle addresses 45 which are appropriate recipients of an emission control command 48 communicated by the network management center 12 through the communications satellite 14 to an integrated communications terminal 18 installed on the vehicle 16.

Figure 3:
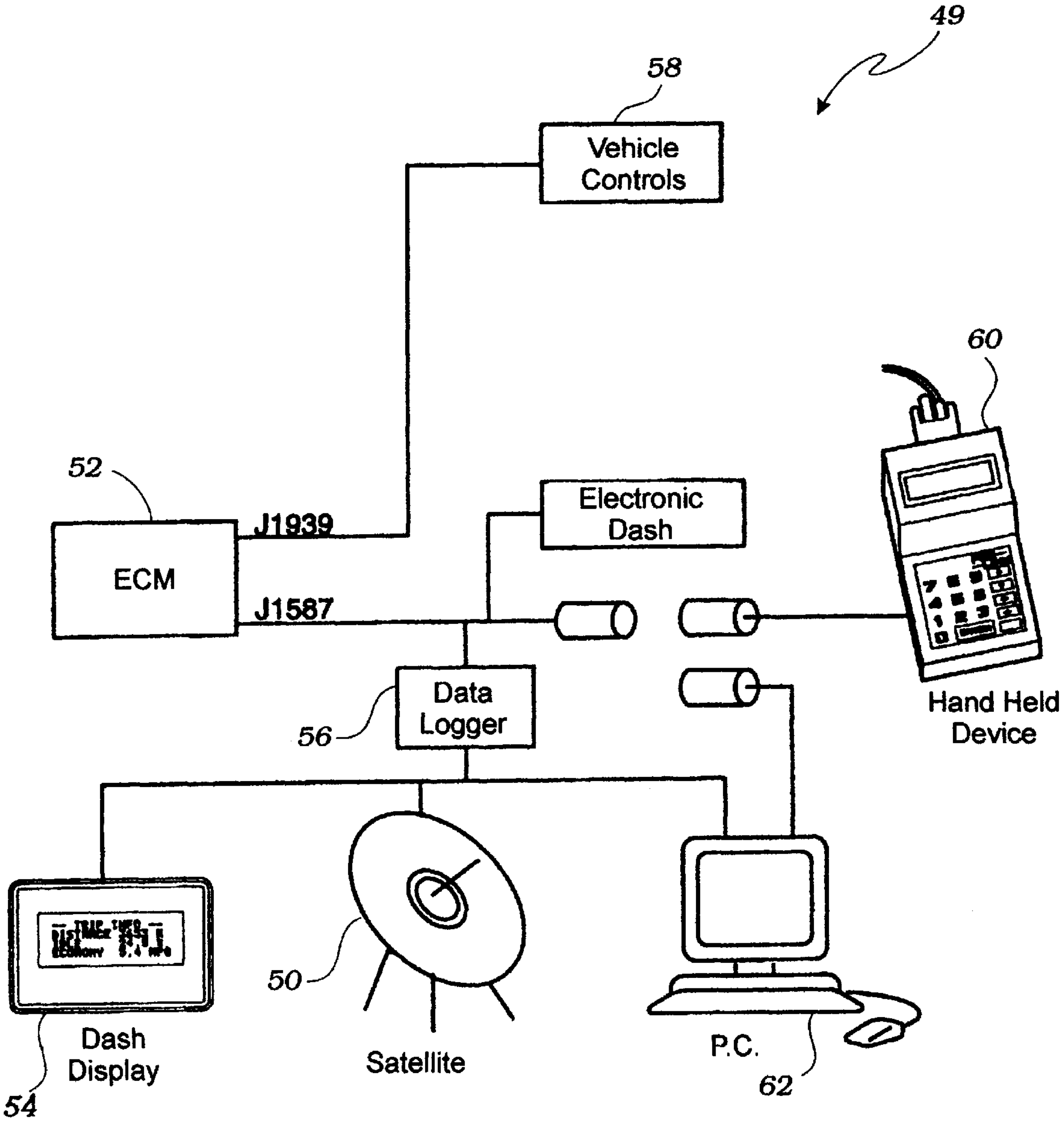
FIG. 3 is a combination schematic and block diagram of a vehicle electronic control system.

Referring now also to FIG. 3, a vehicle electronic control system 49 includes a satellite dish 50 and a mobile communications terminal 18 which receives the emission control command 48 for further relay to an engine control module 52 for implementation by a vehicle control 58. Alternatively, the emission control command 48 can be posted on the dash display for driver actuation of a manual pollution control device (not shown). Emission compliance information can be stored on the vehicle data logger 56 for off-loading of emission compliance certification to a hand-held device 60 or a desk-top computer 62 etc. Preferentially, the engine data system supports interfaces common to heavy-duty vehicles, including but not limited to SAE J1708, SAE J1587, and SAE J1939.

Figure 4:
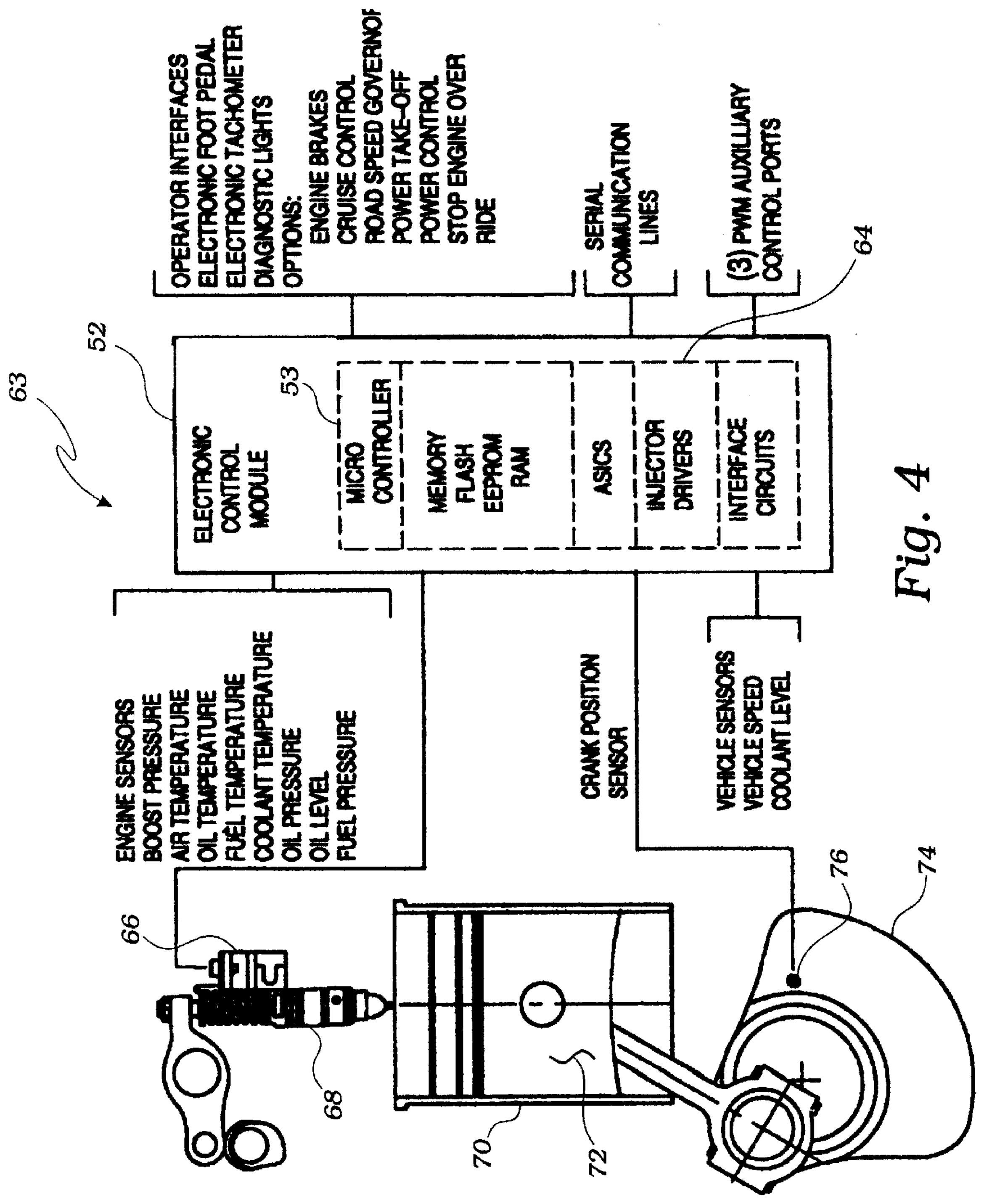
FIG. 4 is a combination schematic and block diagram of an electronic control unit interface.

With reference to FIG. 4, in one exemplary embodiment of the invention, and a person skilled in the art will know many additional implementations, the emission control command 48 can be implemented on an engine equipped with an electronic control system 63 by providing a new timing command for the injector drivers 64 which activate the fuel control solenoid 66 (or, alternatively, by a piezoelectric actuator) to achieve a new beginning of injection of fuel by the injector nozzle 68, relative to the top dead center position of a piston 72 and crankshaft 74 relative to the cylinder 70 as determined by a crank position sensor 76.

Figure 5:
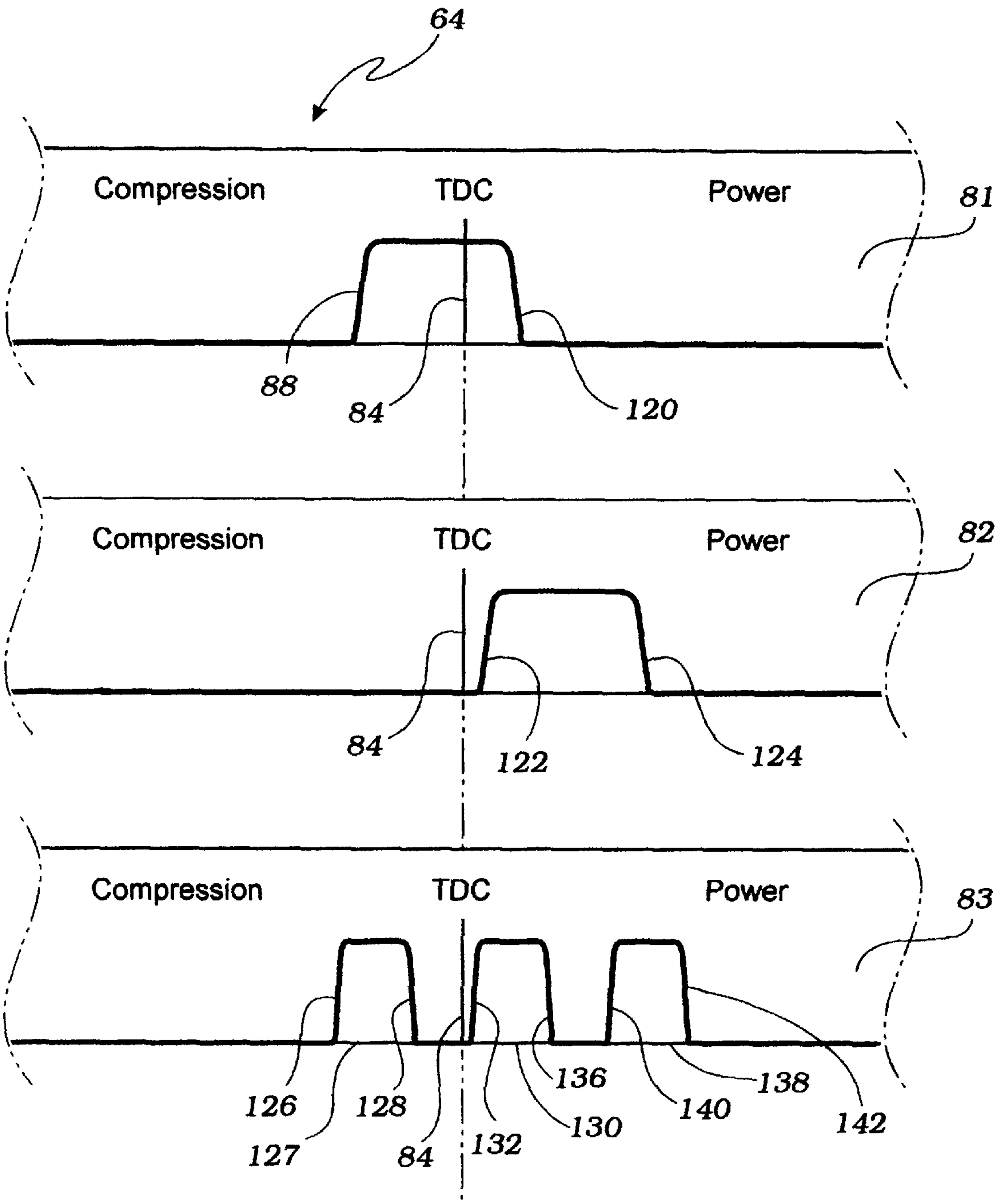
FIG. 5 is a diagrammatic representation comparing modes of engine timing operation.

FIG. 5 shows a graphic representation of an injector driver memory 64 which stores digital data for one or more injection timing maps 81, 82, 83 having data sets that include a top dead center position 84. The timing map 81 shows one prior art pollution-control injector driver timing relative to the top dead center position 84 for a 49-state EPA emission compliance certification. In this example the beginning of injection 88 of fuel occurs during the latter part of the compression stroke and before the top dead center position 84, although other timing positions for the beginning of injection would be obvious to a person skilled in the art. The end of injection 120 in this example occurs early in the power stroke and after top dead center 84, although other positions for timing for the end of injection would be obvious to those skilled in the art.

A second timing map 82 shows typical prior art pollution-control injector driver timing relative to the top dead center position 84 for EPA very low emission compliance certification for sale in a clean air non-attainment area, such as California. In this example the beginning of injection 122 of fuel occurs during the very early part of the power stroke and just after the top dead center position 84, although other timing positions for the beginning of injection would be obvious to a person skilled in the art. The end of injection 124 in this example occurs later in the power stroke and well after top dead center 84, although other timing positions for the end of injection would be obvious to those skilled in the art. This mode of operation usually has a higher emission of carbon dioxide than the first described injection timing, with a commensurate loss of economic value and an increase in emission of global warming gases.

A third timing map 83 shows the prior art as disclosed in U.S. Pat. No. 5,265,562 and U.S. Pat. No. 5,460,128 as well as U.S. Pat. No. 5,566,650 as issued to the present inventor. This timing map shows the utilization of a triple injection process to limit combustion chamber pressure and also to limit combustion chamber temperature, which is a proven pollution control method for reduced creation rate of oxides of nitrogen, an ozone precursor. This injection timing can be utilized in metro areas with a severe clean air non-attainment status as an early introduction of advanced clean air technology for ultra-low emissions.

In this example, the pollution-control injector driver timing for the beginning 126 of the first injection 127 of fuel occurs during the latter part of the compression stroke and just before the top dead center position 84, although other timing positions for the beginning of the first injection would be obvious to a person skilled in the art. The end of the first injection 128 in this example occurs later in the compression stroke and just before top dead center 84, although other timing positions for the end of the first injection would be obvious to those skilled in the art.

The injector driver timing for the beginning 132 of the second injection 130 of fuel occurs during the very early part of the power stroke and just after the top dead center position 84, although other timing positions for the beginning of the second injection would be obvious to a person skilled in the art. The end of the second injection 130 in this example occurs somewhat later in the power stroke, although other timing positions for the end of the second injection would be obvious to those skilled in the art.

The injector driver timing for the beginning 140 of the third injection 138 of fuel occurs during the later part of the power stroke after the end of the second injection 136, although another timing for the beginning of the third injection would be obvious to a person skilled in the art. The end 142 of the third injection 138 in this example occurs an additional time later in the power stroke, and is, in this example, approximately equal to the end of the single injection 124 of the late injection timing of the second timing map 82. Other timing positions for the end of the third injection would be obvious to those skilled in the art.

In the preferred embodiment of pollution control, the multiple injection process utilizes an early beginning 126 of the first injection 127. Other combinations of two or more injections, including four or more, and as many as 100 separate injections, accomplished by use of a piezoelectric actuator in place of a solenoid actuator, will be obvious to a person skilled in the art. One or more of the multiple injection timings will produce ultra-low emission of ozone precursors in combination with low carbon dioxide emissions, while a different set of multiple injection timings will enable engine operation with low emission of ozone precursors in combination with very low carbon dioxide emissions.

Figure 7:
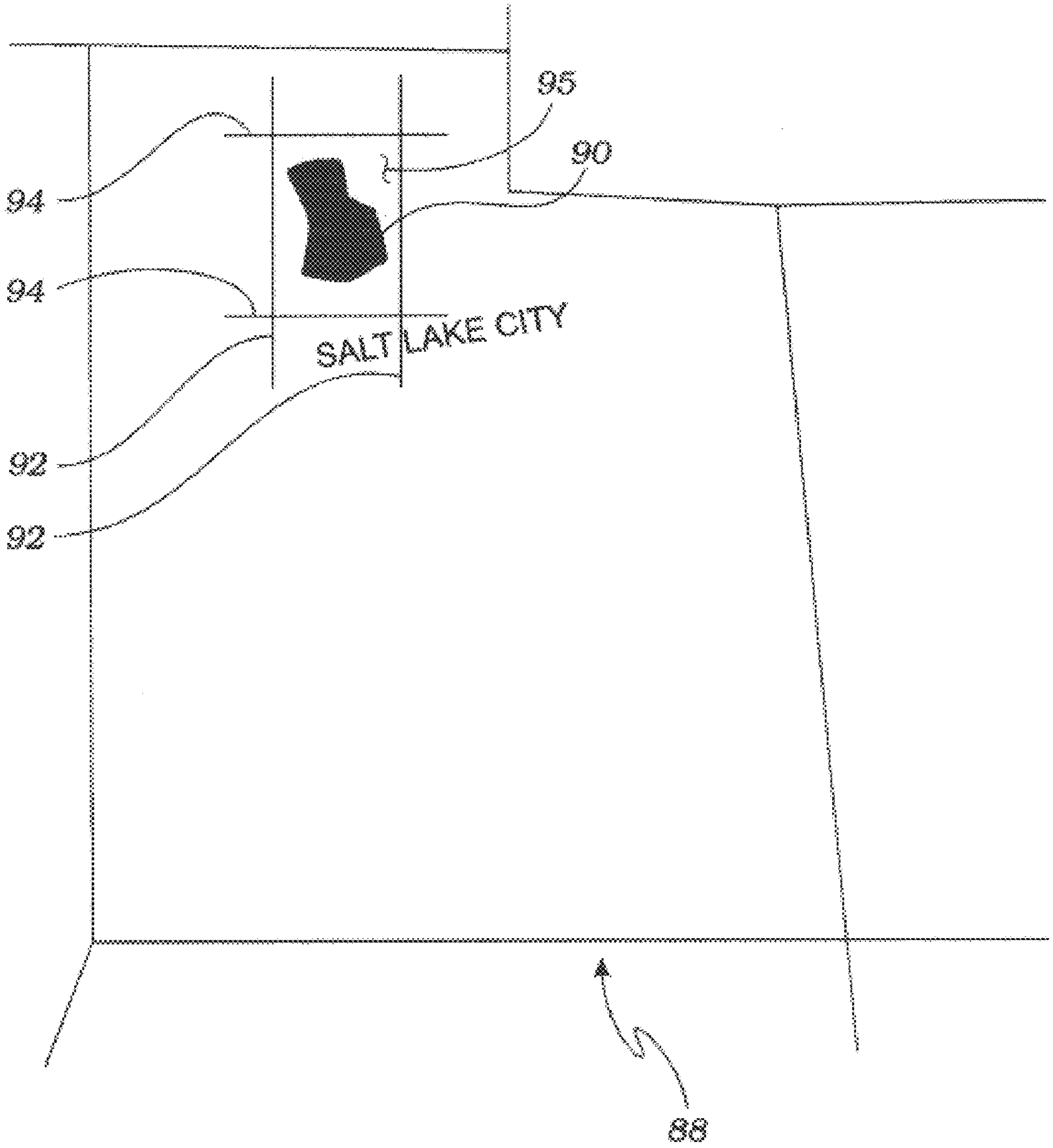
FIG. 7 is a map of Utah illustrating certain characteristics in the Salt Lake City area.

In the preferred embodiment of adaptive emission control, the engine control module 52 uses one multiple injection timing map 83 for low emission operation in a clean air metro area and then, on receiving a pollution control command 48, switches to a different multiple injection timing map 83 for ultra-low emission operation in clean air non-attainment metro area 95, FIG. 7. This method of operation enables early attainment of compliance with the National Ambient Air Quality Standards as compared with the prior art, while providing national economic benefits as well achieving global environmental objectives.

Figure 6:
FIG. 6 is a map of the United States showing ozone non-attainment areas.

FIG. 6 is a map 55 of the United States showing numerous metro areas 56 classified as Ozone Non-attainment Areas by the EPA. A vehicle 16, first sold in Utah, and operating according to the present invention between Sacramento, Calif. and Chicago, Ill. utilizes injector timing map 83 while in the Sacramento Metro Area when that location is under a forecast of a clean air non-attainment day. When the vehicle has left the non-attainment day metro area as registered by data from the global positioning satellite 20, or alternatively, has received a new pollution control command as a result of a revised air quality forecast 32, the engine control unit 52 switches the operation of the injectors to injector timing map 81. However, on a day when Salt Lake City and Chicago are in full attainment for clean air, the engine continues to operate according to the injector timing map 81, achieving significant reduction in emission of carbon dioxide and an economic a benefit from reduced fuel use.

A similar vehicle 16 first sold in California would operate in with injector timing map 82 when driving in California on a clean air day. When an emission control command 48 is received by this vehicle the operator switches to injector timing map 83 while in the Metro Area under a forecast of a clean air non-attainment day.

FIG. 7 is a map 88 of Utah, showing the Salt Lake City metro area 90, two longitude lines 92, and two latitude lines 94 that define a control zone 95 where ultra-low emission compliance rewards engine operation according to injector timing map 83 on a day that has a forecast for clean air non-attainment in the Salt Lake City metro area 90. A vehicle operating according to the present invention has a pollution control command 48 stored in the memory of the engine control unit 52 as a result of the daily air quality forecast. When the mobile communications terminal receives a position signal that indicates that the vehicle is within the control zone 95, a command is sent to the engine control unit 52 causing the microcontroller 53 to switch to injector timing map 83, with said mode of operation continuing until a new location signal is received that indicates departure from the control zone 95.

Figure 8:
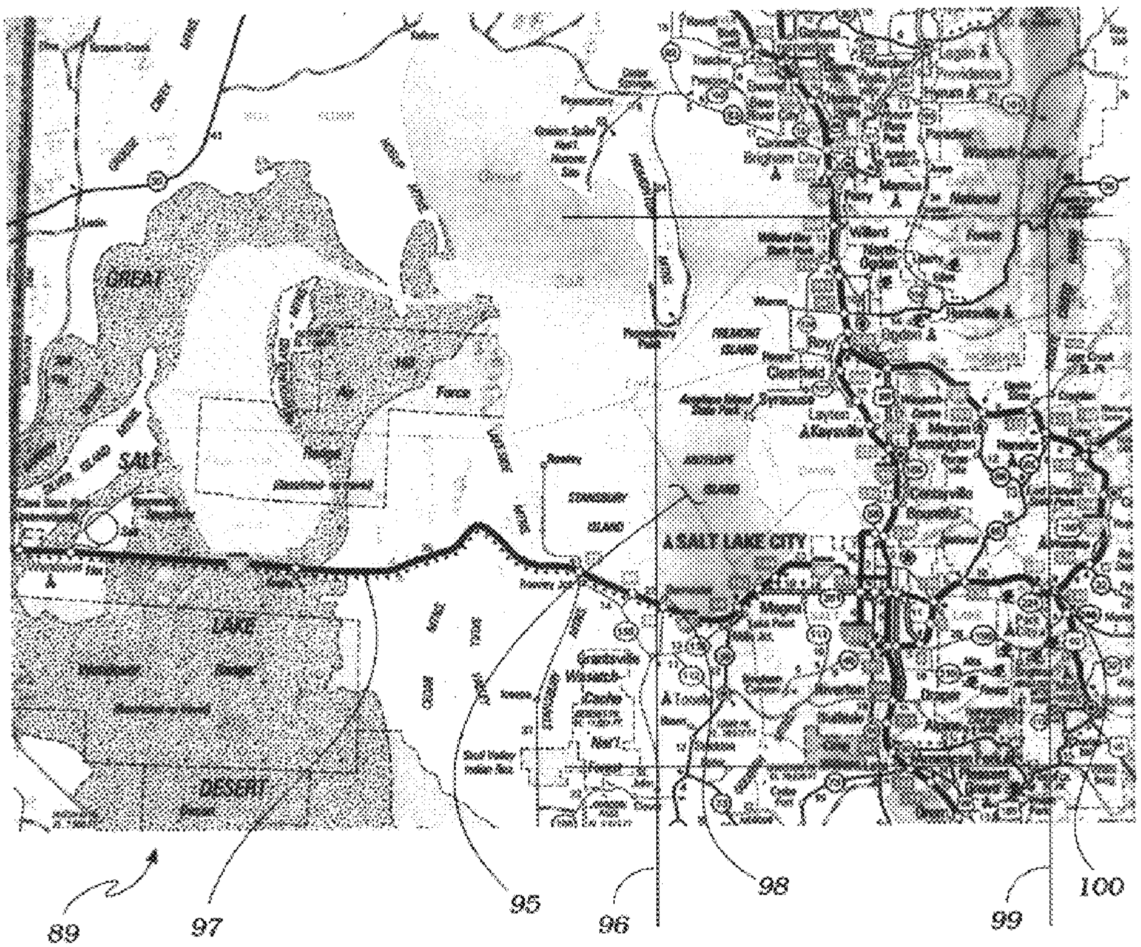
FIG. 8 is a map of Salt Lake City and the surrounding region.

As illustrated by FIG. 8, another exemplary method of putting the invention into practice utilizes a standard road map 89 of the Salt Lake City area in conjunction with a pollution control command 48 communicated by telephone message, facsimile message, pager message or other simple communication means. A vehicle traveling on a specific roadway 97 such as Interstate 80, with a western boundary 96 of the control zone 95, identified by a feature such as the town of Burmester 98 and an eastern boundary 99 identified by a feature such as the intersection 100 with Highway 40, allows a vehicle operator to implement the objects of the present invention without an on-board computer or global positioning system. In this example the mode-switching command 48 is accomplished by a device as simple as a mechanical or electronic control to actuate an exhaust gas recirculation valve, which is readily understood and implemented by a person skilled in the art.

Figure 9:
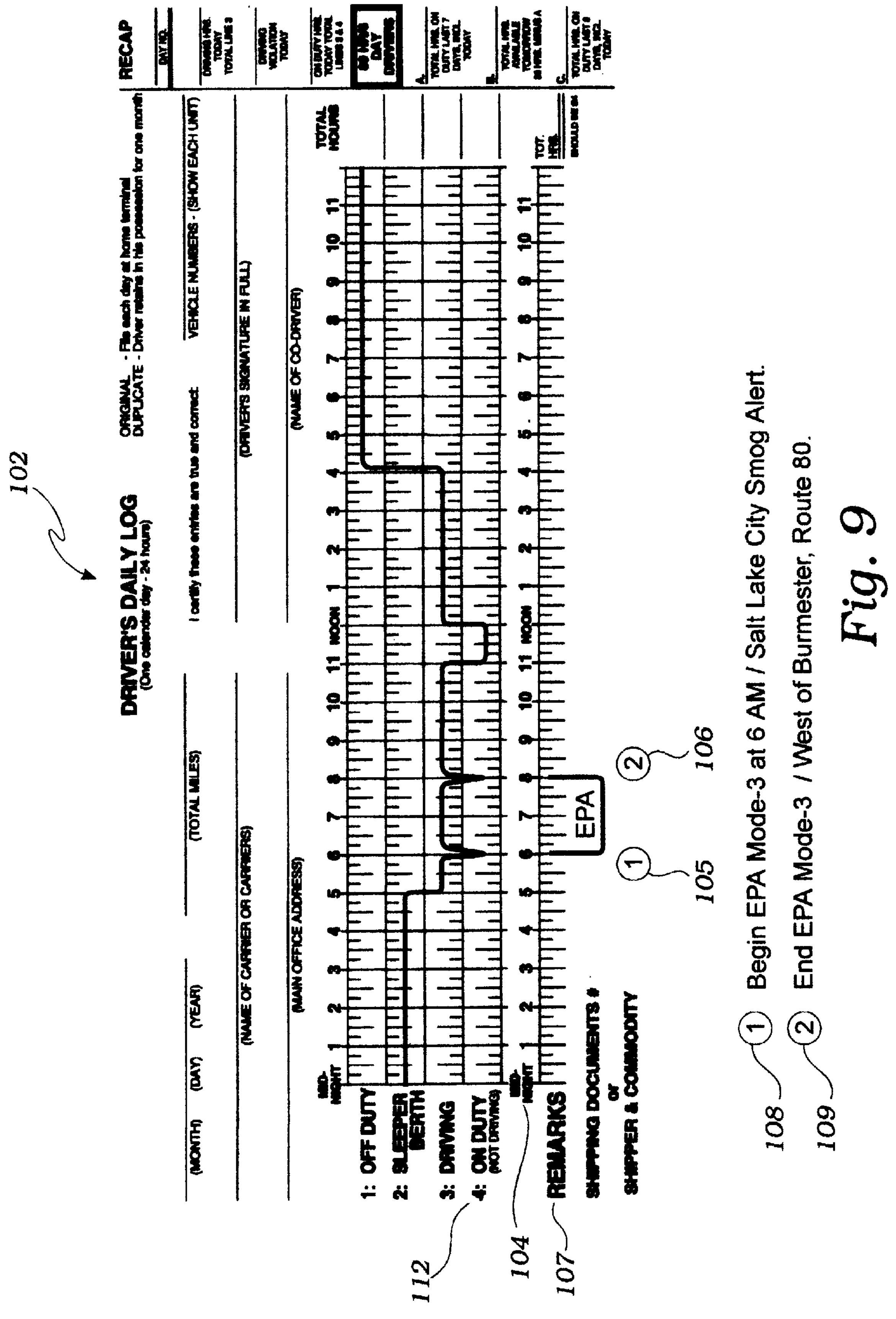
FIG. 9 is an illustration of an example of a driver's daily log as used in the present invention.

With reference now to FIG. 9, a compliance recording means 102, also referred to herein as a time and location recording means or device, can be as simple as a standard Department of Transportation approved Driver's Daily Log, with a time-based pollution control command 48 shown to be acted on by the markings 105 at 6 AM on the Driver's Daily Log and a location-based pollution control command 48 recorded 106 when the vehicle exits the control zone 95. The remarks area 107 of the Driver's Daily Log is shown to contain notations by the driver confirming the beginning 108 and the end 109 of the ultra-low emission engine operation.

Obviously, good practice in recording the beginning 108 and end 109 of operation will include a brief period of "on duty but not driving" for each event as shown on the four "on duty" 112 lines of the Driver's Daily Log 102.

It will also be understood that the invention can be put into practice with various emission control devices, including spark timing changes with spark ignition engines, variable valve timing, variable exhaust gas recirculation, variable modes of operation of catalytic converters including selective catalytic reduction, water injection, variable fuel supply and other pollution control methods and devices as known in the prior art.

Additionally, it will be understood that the invention can be put into practice with external combustion equipment, such as electric power plants, as well as with non-combustion equipment, such as painting facilities.

Reiterating then, the invention utilizes an apparatus comprising a means for producing energy by the combustion of fuel, the energy producing means is enabled by an air breathing and combustion products exhausting process such as in an internal combustion engine, and is further enabled wherein said process is adjustable between at least two distinct modes of operation, primarily by dynamically adjusting engine timing; one said mode resulting in low emission of carbon dioxide and ultra-low emission of ozone precursors, ozone and other atmospheric pollutants, and another said mode resulting in ultra-low emission of carbon dioxide and low emission of ozone precursors, ozone and other atmospheric pollutants; the energy producing means engaged for control by an engine control module providing a switching means enabled for operating the energy producing means in any one of the at least two, but potentially more, distinct modes of operation; the apparatus further comprising a time and location recording means enabled for automatically recording time of day and geographic location of the mobile apparatus at each change of said mode. Preferably, the engine control module is enabled through an algorithm, for control by a wave energy signal of remote origin and in accordance with a pollution control protocol adapted in accordance with an air quality forecast. The method of the present invention is enabled by an interpretive algorithm enablement in creating a precise metro area forecast and further enabled by a definitive time and location of said mode switching; said algorithm comprising: receiving an air quality forecast of peak ozone value ($POV_{fcst}$); determining the pollution standard index number (PSI) corresponding to the $POV_{fcst}$; transmitting the remote wave energy comprising data based upon the PSI to the apparatus; implementing a primary appropriate operating mode if $PSI \leqq X$; implementing an alternate appropriate operating mode if $PSI > X$; repeating the algorithm at each successive time increments; wherein "X" corresponds to a number estimated to provide the highest probability of operating in ultra-low emission mode when necessary.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus comprising a means for producing energy by the combustion of fuel, the energy producing means enabled by an air breathing and combustion products exhausting process and further enabled wherein said process is adjustable between at least two distinct modes of operation; one said mode resulting in low emission of carbon dioxide and ultra-low emission of ozone precursors, ozone and other atmospheric pollutants, and another said mode resulting in ultra-low emission of carbon dioxide and low emission of ozone precursors, ozone and other atmospheric pollutants; the energy producing means engaged for control by a control module providing a switching means enabled for operating the energy producing means in any one of the at least two distinct modes of operation; the apparatus further comprising a time and location recording means for recording time of day and geographic location of the apparatus at each change of said mode.

2. The apparatus of claim 1 wherein the control module is enabled for control by a wave energy signal of remote origin and in accordance with a pollution control protocol adapted in accordance with an air quality forecast.

3. A method of operating an apparatus comprising the steps of: a) producing mechanical energy by the combustion of fuel in the apparatus, an energy producing means enabled by an air breathing and combustion products exhausting process; b) adjusting the process between at least two distinct modes of operation; one said mode resulting in low emission of carbon dioxide and ultra-low emission of ozone precursors, ozone and other atmospheric pollutants, and another said mode resulting in ultra-low emission of carbon dioxide and low emission of ozone precursors, ozone and other atmospheric pollutants; c) providing control of the energy producing means by a switching means enabled for operating the energy producing means in any one of the at least two distinct modes of operation; d) providing recording of time of day and geographic location of the apparatus at each change of said mode.

4. The method of claim 3 further comprising the step of enabling the switching means by a wave energy signal of remote origin and in accordance with a pollution control protocol adapted in accordance with a series of pertinent air quality forecasts.

5. The method of claim 4 comprising the further step of acquiring a meteorology data set from a network management center.

6. The method of claim 4 comprising the further step of originating the remote wave energy signal at a network management center and the further step of transmitting the energy signal through a communications satellite, and the still further step of receiving a location signal and a time signal from a global positioning satellite.

7. The method of claim 4 wherein the process control means is enabled by an interpretive algorithm enablement in creating a precise metro area forecast and further enabled by a definitive time and location of said mode switching; said algorithm comprising: receiving an air quality forecast of peak ozone value ($POV_{fcst}$); determining the pollution standard index number (PSI) corresponding to the $POV_{fcst}$; transmitting the remote wave energy comprising data based upon the PSI to the apparatus; implementing a primary appropriate operating mode if $PSI \leqq X$; implementing an alternate appropriate operating mode if $PSI > X$; repeating the algorithm at each successive time increments; wherein "X" corresponds to a number estimated to provide the highest probability of operating in ultra-low emission mode when necessary.

8. The method of claim 4 wherein the air quality forecasts are spaced by not more than 12 hours apart.

9. The method of claim 8 wherein the air quality forecasts include pertinent weather forecasts.

10. The method of claim 8 wherein the air quality forecasts include pertinent metro areas affected thereby.

11. The method of claim 3 further comprising the step of enabling the switching means by a wave energy signal of remote origin and in accordance with a pollution control command.

12. The method of claim 11 wherein the pollution control command is in response to a series of air quality forecasts.

13. The method of claim 12 wherein each of the air quality forecasts include a pertinent weather forecast.

14. The method of claim 13 wherein the air quality forecasts include descriptions of pertinent metro areas affected thereby.

* * * * *